United States Patent
Hayashi et al.

(10) Patent No.: US 6,169,336 B1
(45) Date of Patent: Jan. 2, 2001

(54) CREW PROTECTION APPARATUS

(75) Inventors: Haruyoshi Hayashi; Yasuo Saito; Kunihiro Kaneko; Takayuki Kishi, all of Omiya (JP)

(73) Assignee: Calsonic Kansei Corporation, Tokyo (JP)

( * ) Notice: Under 35 U.S.C. 154(b), the term of this patent shall be extended for 0 days.

(21) Appl. No.: 09/205,226

(22) Filed: Dec. 4, 1998

(30) Foreign Application Priority Data

Dec. 4, 1997 (JP) .................................................... 9-334620

(51) Int. Cl.[7] .................................................. B60R 21/32
(52) U.S. Cl. ........................ 307/10.1; 307/121; 280/735; 701/45
(58) Field of Search ................................. 307/10.1, 121; 280/735; 701/45

(56) References Cited

U.S. PATENT DOCUMENTS

| | | | |
|---|---|---|---|
| 5,204,547 | * | 4/1993 | Schumacher et al. ............... 307/10 |
| 5,343,394 | * | 8/1994 | Takeuchi et al. .................. 307/10.1 |
| 5,432,385 | * | 7/1995 | Kincaid et al. ................... 307/10.1 |
| 5,596,497 | * | 1/1997 | Honda ............................. 307/10.1 |
| 5,872,460 | * | 2/1999 | Bennett et al. ...................... 280/735 |
| 6,037,674 | * | 3/2000 | Hargedon et al. ................. 307/10.1 |

* cited by examiner

Primary Examiner—Fritz Fleming
(74) Attorney, Agent, or Firm—Sughrue, Mion, Zinn, Macpeak & Seas, PLLC

(57) ABSTRACT

A crew protection apparatus includes a DC power source; a squib connected in series with the DC power source; a plurality of switch circuits inserted between the DC power source and the squib or between the squib and the ground side; an acceleration sensor for detecting an acceleration caused by a collision; a collision determination circuit for, when receiving an acceleration signal from the acceleration sensor, determining the scale of a collision on the basis of the acceleration signal and outputting an ignition control signal in coincident with the timing supplied to the switch circuit and further outputting a current control signal in synchronism with the ignition control signal when it is determined that the collision is a serious collision; and a current limit circuit for limiting the magnitude of an ignition current flowing through the squib in accordance with the ignition control signal and the current control signal from the collision determination circuit.

6 Claims, 4 Drawing Sheets

CREW PROTECTION APPARATUS

BACKGROUND OF THE INVENTION

1. Field of the Invention

The present invention relates to a crew protection apparatus which inflates an air bag at the time of collision of a vehicle or the like to protect a passenger from the collision.

2. Description of the Related Art

Such an example of conventional passenger protection apparatus will be explained with reference to FIG. 3.

In this figure, a reference numeral 1 depicts a vehicle-mounted battery, 2 an ignition switch and 3 a DC/DC converter for boosting the output voltage of the vehicle-mounted battery 1 and outputting the boosted voltage. A reference numeral 4 depicts a current limit circuit formed by a first field effect transistor 7, a current detection resistor 9, a comparison circuit 10, a constant current source 11, a resistor 12, a charge pump circuit 13, a switch circuit 14 or the like. Further, a reference numeral 5 depicts a reverse-current prevention diode, 6 a backup capacitor, and 8 a second field effect transistor.

The backup capacitor 6 is charged by the DC/DC converter 3 through the reverse-current prevention diode 5. The second field effect transistor 8 has a drain side connected to the non-grounded side terminal of the backup capacitor 6 and a source side connected to a percussion cap or squib 15 described later. A current of about 2 amperes corresponding to 99%, for example, of the ignition current flowing into the squib 15 flows through the transistor 8 as an ignition current.

The current limit circuit, or a squib drive control circuit 4 will be explained below.

The first field effect transistor 7 is an N channel type with a small capacity for shunting the current flowing from the backup capacitor 6 and the reverse-current prevention diode 5 in order to control the current flowing through the second field effect transistor 8. The first field effect transistor 7 is connected at its drain side to the drain side of the second field effect transistor 8 and connected at its source side to the source side of the second field effect transistor 8 through the current detection resistor 9 with a small allowable power. A small current of several milli-amperes (corresponding to the remaining 1%, for example, of the ignition current flowing into the squib 15) flows through the first field effect transistor 7.

The comparison circuit 10 has a non-inverted (+) input terminal supplied with a reference voltage generated by the constant current source 11 and the resistor 12 connected in series and has an inverted (−) input terminal supplied with the voltage generated by the current detection resistor 9. The output terminal of the comparison circuit is connected to the output terminal of the switch circuit 14 and to the gates of the first and second field effect transistors 7, 8. The comparison circuit 10 changes its output into a high level when the reference voltage is larger than the input voltage and into a low level when the reference voltage is not larger than the input voltage.

A reference numeral 18 depicts an acceleration sensor for detecting an acceleration signal which is generated at the time of the collision of a vehicle. A reference numeral 19 depicts a microcomputer which determines the scale of the collision on the basis of the acceleration signal from the acceleration sensor 18 and supplies an ON signal to the switch circuit 14 when it is determined that the collision is a serious accident. The microcomputer 19 supplies a trigger signal to the charge pump circuit 13 when a power source is turned on.

The charge pump circuit 13 will be explained in detail with reference to FIG. 4.

The charge pump circuit 13 includes a voltage doubler rectifier circuit formed by an oscillation circuit 13g, an inverter 13a, diodes 13d, 13e, capacitors 13c, 13f and a resistor 13b. When the oscillation circuit 13g is supplied with the trigger signal, for example, the signal which becomes high level at the time of the turning-on of the power source from the microcomputer 19 described later, the voltage doubler rectifier circuit generates a voltage twice the amplitude of the voltage (+V) of the power source (double-amplitude voltage) only during the period where the trigger signal is supplied thereto. The voltage doubler rectifier circuit supplies the double-amplitude voltage thus generated to the first field effect transistor 7 in order to drive the first and second field effect transistors 7, 8 thereby to set the gate voltages of the transistors 7, 8 higher than the drain side voltages thereof.

The squib 15 is connected at its one end to the output side of the squib drive control circuit 4 and at it's the other side to the ground through a reverse current prevention diode 16 and an acceleration switch 17 connected in series. The microcomputer 19 determines the state of the collision on the basis of the acceleration signal from the acceleration sensor 18 for detecting the collision of the vehicle. When the microcomputer determines that it is necessary to operate the air bag or the like, the microcomputer supplies the ON signal to the switch circuit 14 to turn it on and simultaneously supplies the trigger signal to the charge pump circuit 13.

The operation of the aforesaid arrangement of the conventional crew protection apparatus will be explained.

(a) When the power source is turned on, the microcomputer 19 supplies the trigger signal of a high level to the charge pump circuit 13 thereby to continuously operate the oscillation circuit 13g and hence always charge the second capacitor 13f, whereby the charge pump circuit 13 outputs the double-amplitude voltage.

(b) In this state, if the microcomputer 19 does not output t he ON signal to the switch circuit 14, the s witch circuit 14 is kept in an off state, so that the first and second transistors 7, 8 are maintained in an off state.

(c) In contrast, when the microcomputer 19 determines due to the occurrence of a serious accident that the collision occurred is a serious accident on the basis of the output from the acceleration sensor 18, the microcomputer 19 outputs the ON signal to the switch circuit 14 thereby to turn on the switch circuit 14. As a consequence, the first and second field effect transistors 7, 8 are supplied at the gates thereof with the voltage signals of a high level larger than the voltages of the source sides of the first and second field effect transistors 7, 8, respectively, so that the first and second field effect transistors 7, 8 start to operate in an active area.

Thus, the ignition current flows into the squib 15 through the first and second field effect transistors 7, 8. The magnitude of the shunt current of the ignition current at this time is detected by the current detection resistor 9, and the detection voltage of the current detection resistor 9 is supplied to the inverted (−) input terminal of the comparison circuit 10. As a result, when the voltage of the inverted (−) input terminal of the comparison circuit 10 becomes larger than the reference voltage, the comparison circuit changes its output level into a low level to lower the gate voltages of the first and second field effect transistors 7, 8 thereby to shift the operation states thereof toward the non-conductive states.

However, when the first and second field effect transistors 7, 8 approach toward the non-conductive states, the voltage of the positive voltage side of the current detection resistor 9 decreases. When the voltage of the positive voltage side of the current detection resistor 9 becomes smaller than the reference voltage applied to the comparison circuit 10, the output of the comparison circuit 10 becomes high level, so that the output voltage of the charge pump circuit 13 is outputted again through the switch circuit 14. Accordingly, the gate voltages of the first and second field effect transistors 7, 8 increase and shift again toward the conduction states in the active areas.

Hereinafter, the aforesaid operation is repeated during the period where the switch circuit 14 is turned on so that the constant current flows into the second field effect transistor 8. As a consequence, the constant current is supplied to the squib 15. Of course, the acceleration switch 17 is turned on in this state.

However, according to the aforesaid conventional passenger protection apparatus, there is a possibility that the microcomputer may be accidentally damaged simultaneously with the turning-on of the mechanical type acceleration switch 17, so that the switch circuit 14 may be turned on.

Also, in the case where a current limiter circuit or the second field effect transistor 8 is turned on in order to conduct failure diagnosis, when the acceleration switch 17 is turned on, or a panel connected to the squib 15 is grounded accidentally, there is a fear that the ignition current flows into the squib 15.

SUMMARY OF THE INVENTION

Accordingly, the present invention has been made in view of the aforesaid conventional problem and intends to control the output of an ignition signal to a squib by using a plurality of output signals from a microcomputer with a simple configuration.

In order to achieve the aforesaid object, a passenger protection apparatus according to the present invention comprises a DC power source; a squib connected in series with the DC power source; a plurality of switch means connected to a positive voltage side and a negative voltage side of the squib; an acceleration sensor for detecting an acceleration; a collision determination means for determining a scale of a collision on a basis of an acceleration signal from the acceleration sensor and outputting a current control signal together with an ignition control signal when it is determined that the collision is a serious collision; and a current limit circuit for turning on each of the plurality of the switch means to flow an ignition current through the squib and limiting a magnitude of the ignition current in accordance with the ignition control signal and the current control signal from the collision determination means.

DETAILED DESCRIPTION OF THE PREFERRED EMBODIMENTS

Now, a description will be given in more detail of preferred embodiments of the invention with reference to the accompanying drawings.

Embodiment 1.

Figure 1:
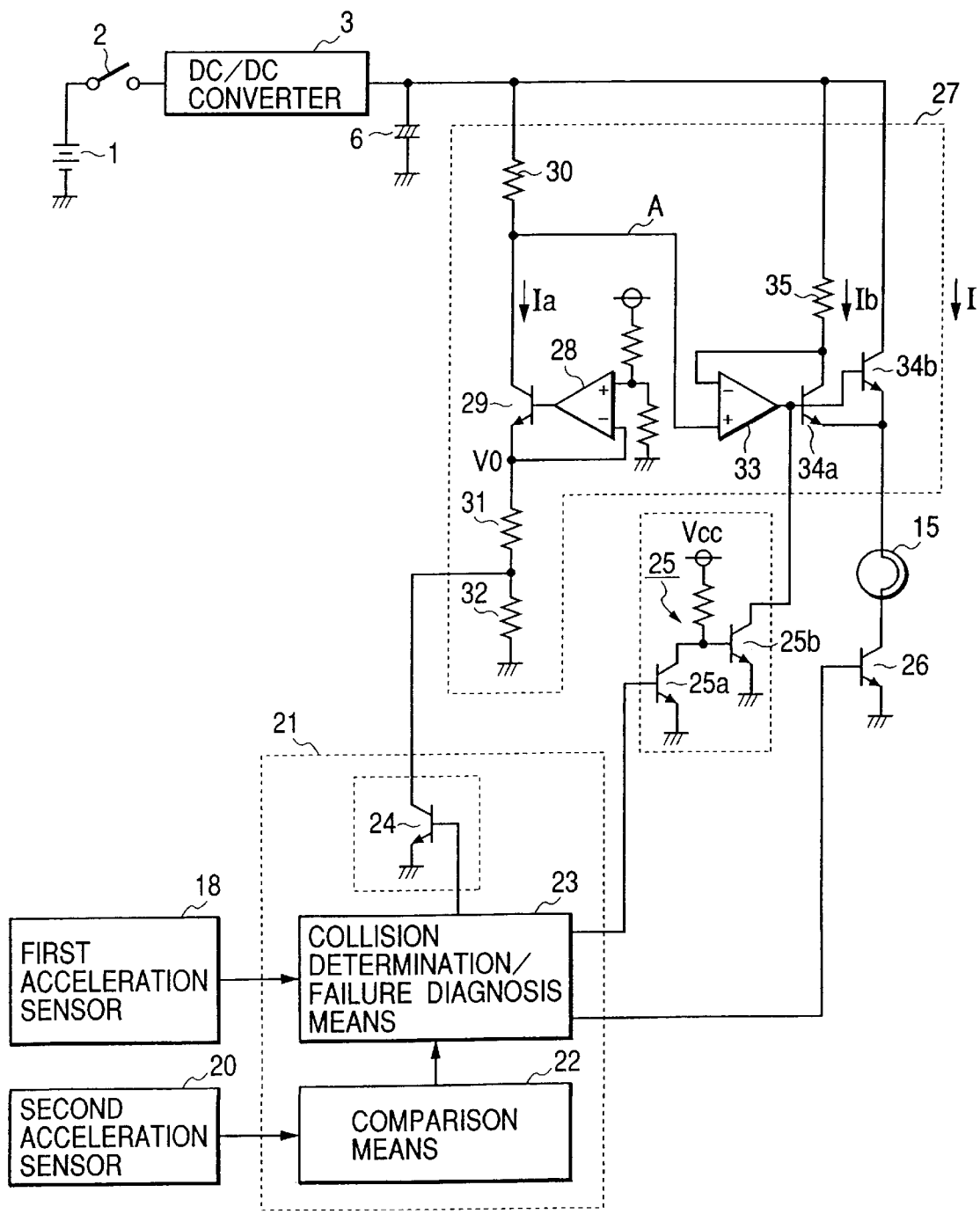
FIG. 1 is a circuit block diagram showing the arrangement of a crew protection apparatus according to an embodiment of the present invention.
Figure 3:
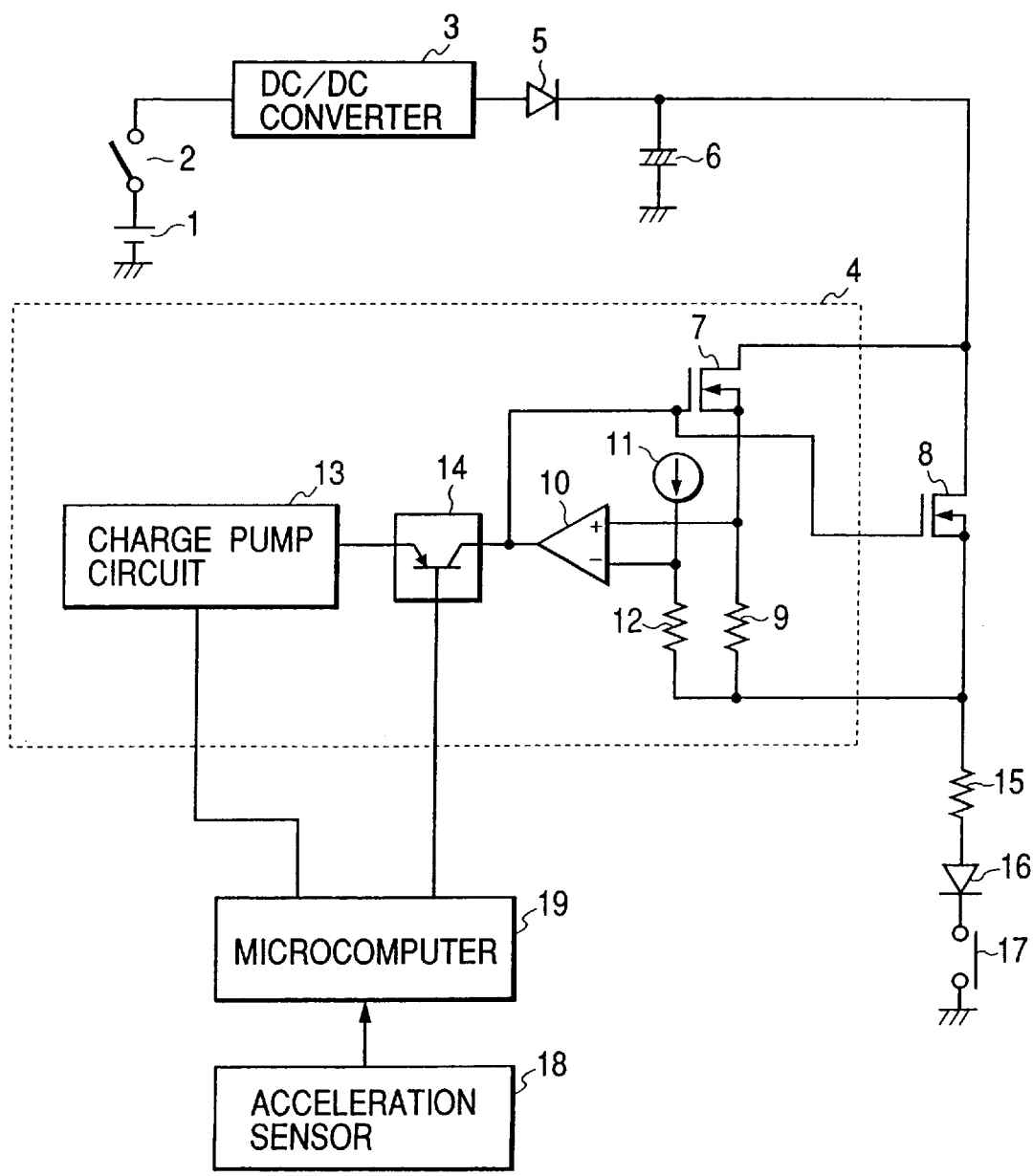
FIG. 3 is a circuit block diagram showing the arrangement of a conventional crew protection apparatus.
Figure 4:
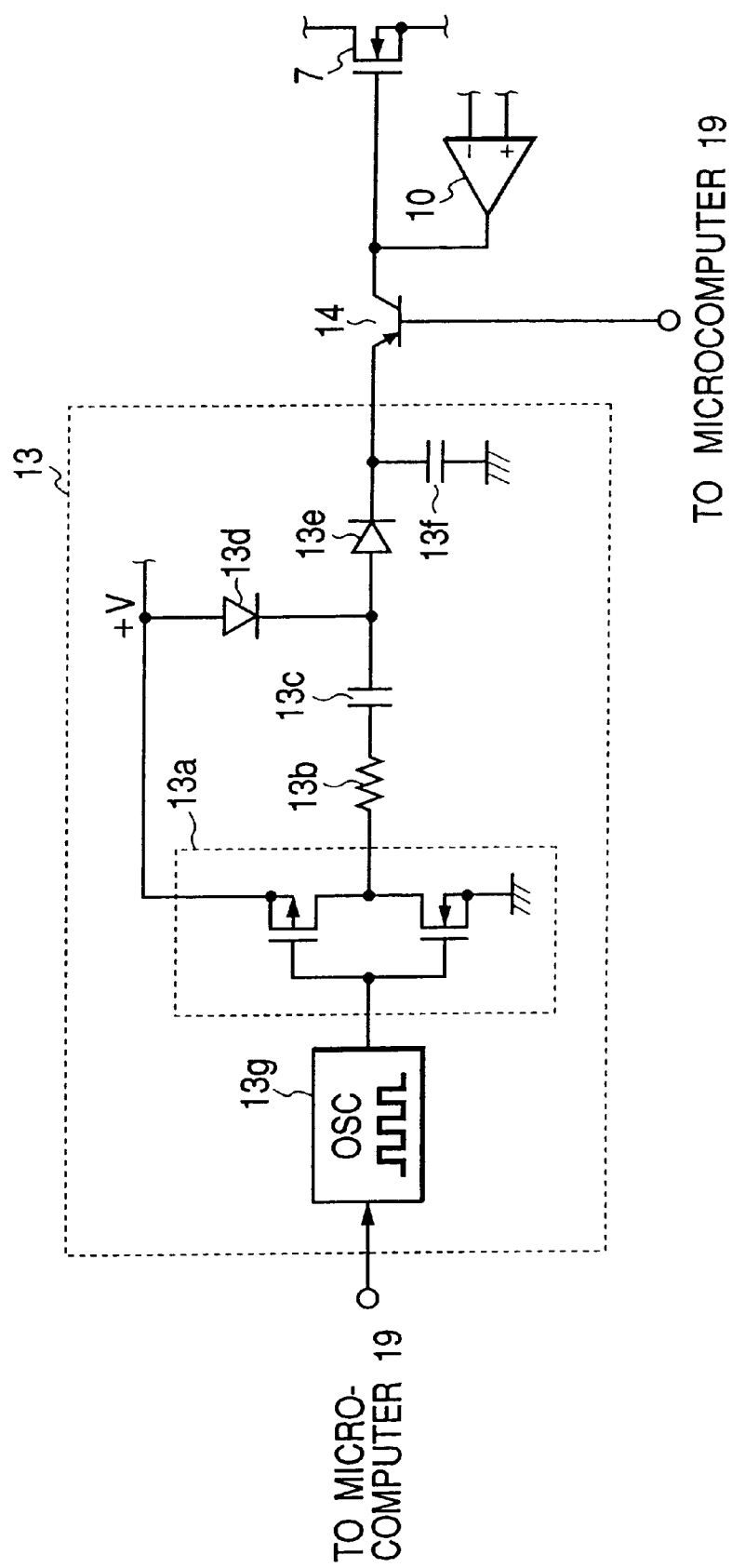
FIG. 4 is a circuit diagram showing the arrangement of a charge pump circuit in FIG. 3.

FIG. 1 shows the arrangement of a passenger protection apparatus according to an embodiment of the present invention. In FIG. 1, like or same parts as those explained in the prior art of FIG. 3 are designated by the same reference numerals and the detailed explanation thereof is omitted.

In FIG. 1, reference numerals 18, 20 depict first and second acceleration sensors for detecting the acceleration at the time of collision. The first and second acceleration sensors 18, 20 have the same efficiency and detect the acceleration to the same direction. A reference numeral 21 depicts a microcomputer formed by a comparison circuit (comparison means) 22, a collision determination/failure diagnosis circuit (collision determination/failure diagnosis means) 23, a switch circuit (switch means) 24 or the like. The comparison circuit 22 compares the magnitude of an acceleration signal supplied from the second acceleration sensor 20 with a reference value, and when the magnitude of the acceleration signal exceeds the reference value, the comparison circuit 22 determines that a collision has occurred and supplies a switch signal to the collision determination circuit 23.

The collision determination/failure diagnosis circuit 23 receives an acceleration signal supplied from the first acceleration sensor 18 and the switch signal from the comparison circuit 22. When the collision determination/failure diagnosis circuit 23 determines that a collision is a serious collision, the collision determination/failure diagnosis circuit 23 outputs a high level signal (current limit signal) to the switch circuit 24, outputs a high level signal (ignition control signal) to a transistor 25a of a drive control circuit 25 thereby to turn off a transistor 25b, and further supplies a high level signal to a switching transistor 26. The function of the mechanical type acceleration switch 17 shown in FIG. 3 is formed by one of collision determination functions of the second acceleration sensor 20, comparison circuit 22, switching transistor 26 and collision determination/failure diagnosis circuit 23.

The switch circuit 24 is normally in an off state. At the time of the occurrence of a serious collision, the switch circuit 24 becomes low level at its output in response to the high level signal from the collision determination/failure diagnosis circuit 23.

A reference numeral 27 depicts a constant-current control circuit formed by a comparison circuit 28, a control transistor 29, a reference current detection resistor 30, a first current adjustment resistor 31, a second current adjustment resistor 32, a comparison circuit 33, drive transistors (switch means) 34a, 34b, a current detection resistor 35 or the like. The comparison circuit 28 compares a set reference voltage with the non-grounded side voltage VO of the first current adjustment resistor 31. The comparison circuit 28 holds the voltage VO of the non-grounded side terminal of the first current adjustment resistor 31 constant and so a value of a constant current Ia is determined by the first and second current adjustment resistors 31, 32.

The constant current Ia is converted into a voltage by the reference current detection resistor 30 and the voltage thus converted is supplied to the non-inverse side (+) input terminal of the comparison circuit 33 through a signal line A. The comparison circuit 33 compares the voltage thus converted with the collector voltage of the drive transistor 34a. The comparison circuit 33 functions such that the voltage across the reference current detection resistor 30 and the voltage across the current detection resistor 35 at the negative potential side, respectively, become identical with each other, whereby the current Ib which is (a value of the current detection resistor 30/a value of the current detection resistor 35)-times as large as the collector current Ia of the drive transistor 34b flows into the drive transistor 34b. The drive transistor 34a has a current capacity of about 100 times as large as that of the drive transistor 34b. The current which flows between the collector and the emitter of the drive transistor 34a is about 10 times as large as a current value Ib which flows into the drive transistor 34a.

The output side of the comparison circuit 33 is connected to the collector of the transistor 25b of the drive control circuit 25. When the transistor 25b is in an off state, the comparison circuit 33 compares the current value Ia which is set by the first and second current adjustment resistors 31, 32 with the collector current Ib of the drive transistor 34a thereby to control the on-state of the drive transistor 34a.

In contrast, when the transistor 25b is in an on state, since the output terminal of the comparison circuit 33 is fixed at a low level, both the drive transistors 34a, 34b are not controlled in an on state.

The function of the aforesaid arrangement of the passenger protection apparatus according to the embodiment will be explained.

(1) In the case where the collision determination/failure diagnosis circuit 23 does not determine that a collision has occurred.

Since the switch circuit 24 is in an off state, the value of the current flowing through the first and second current adjustment resistors 31, 32 is a set current value, that is, a small current value which is insufficient to ignite the squib 15. Thus, even if the microcomputer 21 causes the program error or crash and so the collision determination circuit 23 supplies the high level signal to the drive control circuit 25 and the switching transistor 26, only a small current flows into the squib 15, so that the squib 15 can not be ignited.

Further, the probability of occurrence of such a phenomenon is small that the collision determination/failure diagnosis circuit 23 changes its output signal supplied to the switch circuit 24 into a high level thereby to change the voltage of the connection point between the first and second current adjustment resistors 31, 32 into a low level. That is, the probability of occurrence of such a phenomenon is very small that the three output terminals of the collision determination circuit 23 simultaneously change into a state for flowing an ignition current into the squib 15.

(2) In the case where the collision determination/failure diagnosis circuit 23 determines that a collision has occurred.

Since the switch circuit 24 changes its state into an on state, the connection point between the first and second current adjustment resistors 31, 32 is grounded. Accordingly, the current Ia of a large value flows through the resistor 31, then the current Ia is detected by the current detection resistor 30 and the voltage corresponding to the detected current is supplied to the comparison circuit 33. In this case, since the drive control circuit 25 is in an off state and the switching transistor 26 is in an on state, both the drive transistors 34a, 34b are turned on and hence the ignition current is supplied to the squib 15.

(3) In the case of conducting failure diagnosis of the constant current control circuit.

The collision determination/failure diagnosis circuit 23 has a failure diagnosis function in addition to the collision determination function, and the failure diagnosis function starts instead of the collision determination function. The failure diagnosis function is conducted by temporarily sampling the non-grounded side potential of the squib 15 while a low-level signal is supplied to the switching means 24 by the collision determination/failure diagnosis circuit 23, that is, while a node of the first and second current adjustment resistors 31 and 32 is in a non-contact state.

That is, while the switching means 24 is off (while the ignition current is not outputted), the node of the first and second current adjustment resistors 31 and 32 is brought in the non-grounded state so that the amplitude of the current Ia flowing in the reference current detection resistor 30 is adjusted so as to be a micro-current.

While the ignition current is not outputted (while a low-level signal is supplied to the switching means 24), the collision determination/failure diagnosis means 23 makes the transistor 25b of the drive control circuit 25 intermittently turn off, thereby turning on the drive transistor 34b so that a micro diagnosis current flows through a diagnosis resistor not shown. In this situation, with a potential developed at the non-grounded side of the squib 15 being inputted to the collision determination/failure diagnosis means 23, the drive transistors 34a and 34b are subjected to failure diagnosis, and if occasions demand, the diagnosis result is displayed in a display unit.

With the above structure, even if, for example, harnesses to the squib 15 (corresponding to a line connecting the drive transistor 34b and the squib 15 and a line connecting the squib 15 and the switching transistor 26) are grounded, since the two first and second current adjustment resistors 31 and 32 are in the non-grounded state, and a current flowing in the drive transistor 34b and the squib 15 is adjusted to be a micro diagnosis current, there is no case where the ignition current flows.

Embodiment 2

Figure 2:
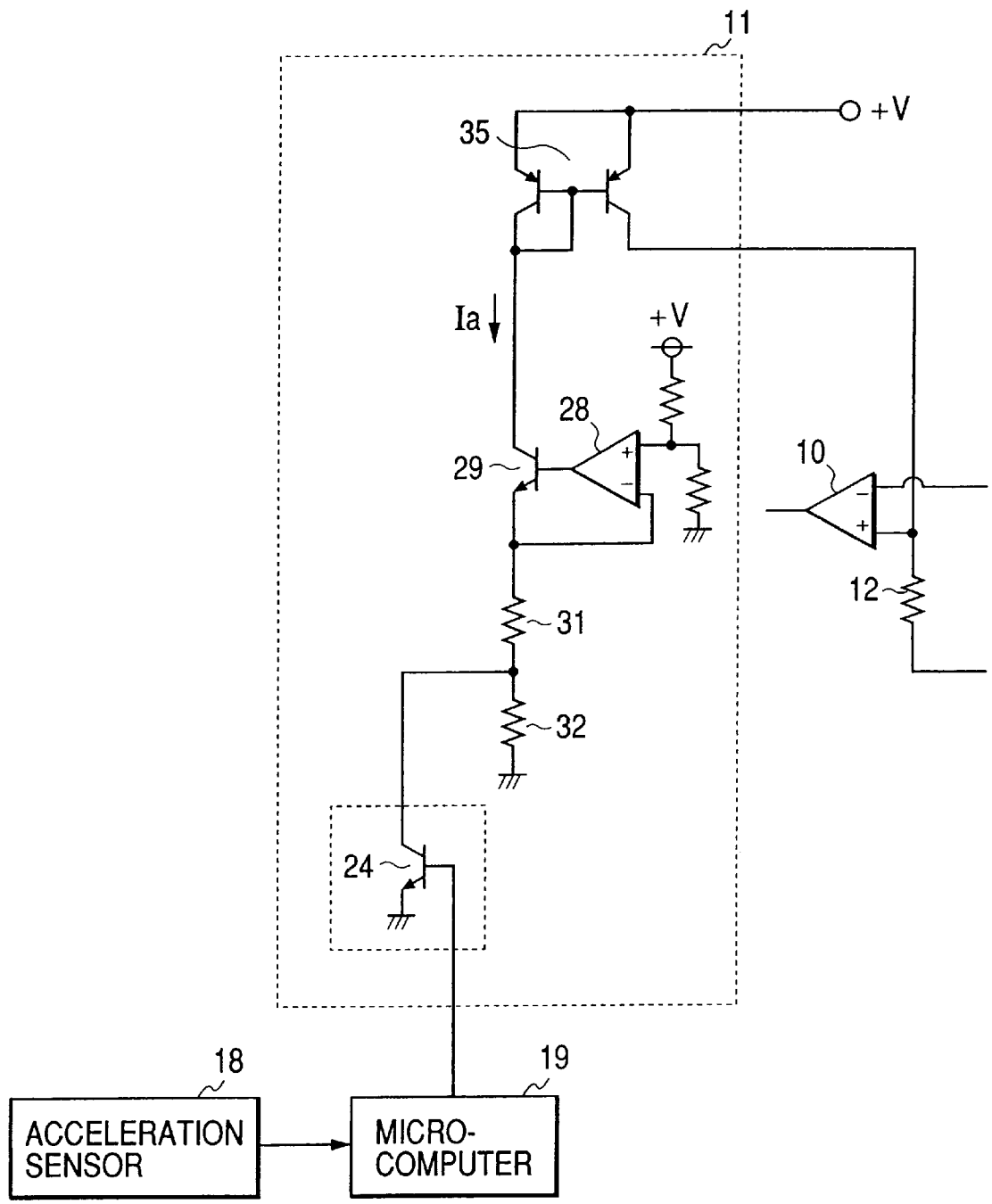
FIG. 2 is a circuit block diagram showing the arrangement of a crew protection apparatus according to another embodiment of the present invention.

In a second embodiment, the constant-current circuit 11 in FIG. 3 may be structured by a circuit shown in FIG. 2.

In FIG. 2, a comparison circuit 28, a control transistor 29, current adjustment resistors 31, 32 and switching means 24 are connected in the same manner as the circuit structure shown in FIG. 1, and a phase inversion circuit 35 is connected between the control transistor 29 and the power line, that is, at the positive potential side of the control transistor 29.

In this case, the switching circuit 24 turns on in response to a high-level signal (current limiter signal) from the microcomputer 19, and the ignition control signal in FIG. 1 corresponds to an on-signal which is supplied to the switch circuit 14 from the microcomputer 19.

As was described above, the present invention can reduce a probability of occurrence of such a phenomenon that an ignition current flows into the squib due to the crash of the microcomputer.

Also, since the switch means is comprised of transistors, it is inexpensive more than the mechanical switch.

Further, since the current limit circuit is comprised of a resistor group, the circuit is manufactured inexpensively.

Further, since a group of resistors are connected in series, the structure is simple.

Further, since a constant-voltage is applied to one end of the resistor group, a constant current can be readily obtained.

What is claimed is:

1. A passenger protection apparatus, comprising:

a DC power source;

a squib connected in series with said DC power source;

a plurality of switches connected to a positive voltage side and a negative voltage side of said squib;

an acceleration sensor for detecting an acceleration;

a collision determination circuit for determining a scale of a collision on a basis of an acceleration signal from said acceleration sensor and outputting an ignition control signal when it is determined that said collision is a serious collision and a diagnosis control signal when a self-diagnosis mode is performed; and a current limit circuit for turning on at least one of said switches to supply a current to said squib and controlling a magnitude of the current in accordance the ignition control signal and the diagnosis control signal output from said collision determination circuit.

2. A passenger protection apparatus as claimed in claim 1, wherein said switches comprise transistors.

3. A passenger protection apparatus as claimed in claim 1, wherein said current limit circuit comprises a plurality of resistors and controls the magnitude of the current by switching a connection state of said resistors on the basis of the current control signal.

4. A passenger protection apparatus as claimed in claim 1, wherein said current limit circuit comprises a plurality of resistors and controls the magnitude of the current by switching over a composite resistor of said resistors on the basis of the current control signal.

5. A passenger protection apparatus as claimed in claim 3 or 4, wherein a constant voltage is applied to one end of said resistors.

6. A passenger protection apparatus as claimed in claim 3 or 4, wherein said resistors are connected in series.

* * * * *